US005636438A

United States Patent [19]

Takagishi

[11] Patent Number: 5,636,438

[45] Date of Patent: Jun. 10, 1997

[54] CONNECTING TERMINAL CUTTING AND CRIMPING METHOD AND APPARATUS

[75] Inventor: Takashi Takagishi, Shizuoka, Japan

[73] Assignee: Yazaki Corporation, Tokyo, Japan

[21] Appl. No.: 506,209

[22] Filed: Jul. 24, 1995

[30] Foreign Application Priority Data

Jul. 25, 1994 [JP] Japan .................................... 6-172669

[51] Int. Cl.$^6$ ............................ H01R 43/04; B23P 19/00

[52] U.S. Cl. ................................ 29/866; 29/753; 29/761; 72/409.06

[58] Field of Search ............................ 29/866, 865, 863, 29/753, 761; 72/409.06, 409.14

[56] References Cited

U.S. PATENT DOCUMENTS

| | | | |
|---|---|---|---|
| 2,878,854 | 3/1959 | Batcheller | 29/753 |
| 3,570,097 | 3/1971 | Bowden, Jr. et al. | 29/753 |
| 3,931,671 | 1/1976 | Dittman | 29/753 |
| 4,272,879 | 6/1981 | Wigby et al. | 29/866 X |
| 5,456,005 | 10/1995 | Satoh et al. | 29/753 X |

FOREIGN PATENT DOCUMENTS

| | | | |
|---|---|---|---|
| 1298076 | 5/1962 | France | 29/753 |
| 2-41830 | 11/1990 | Japan | H01R 43/048 |
| 3-30388 | 3/1991 | Japan | H01R 43/00 |
| 3-152891 | 6/1991 | Japan | H01R 43/055 |

*Primary Examiner*—Peter Vo
*Assistant Examiner*—Khan Nguyen
*Attorney, Agent, or Firm*—Sughrue, Mion, Zinn, Macpeak & Seas

[57] ABSTRACT

A method and apparatus is provided for cutting and crimping connecting terminals which are to be fitted in a connector housing installed in an automobile. The device includes a crimping unit and a cutting unit. The crimping unit includes a shaping die, a cover-squeezing-protrusion crimping punch, and a core-squeezing-protrusion crimping punch, and receives a plurality of connecting terminals connected through coupling protrusions to a carrier plate, to crimp the cover squeezing protrusions and the core squeezing protrusion of each connecting terminal respectively over the cover and the core of a covered conductor. The cutting unit includes a cutting die, and a cutting punch, and cuts the coupling protrusions of the connecting terminals. The working surface of the shaping die includes a cover-squeezing-protrusion supporting surface which is made up of a sunk surface which is a depth smaller than the thickness of the cover of the covered conductor, and a curved surface which is arcuately raised to support a predetermined part of the coupling protrusion of the connecting terminal, so that the predetermined part of the coupling protrusion, when cut, forms no sharp end.

6 Claims, 8 Drawing Sheets

CONNECTING TERMINAL CUTTING AND CRIMPING METHOD AND APPARATUS

BACKGROUND OF THE INVENTION

1. Field of the Invention

This invention relates to a device for cutting and crimping connecting terminals which are to be fitted in a connector housing installed in an automobile (hereinafter referred to as "a connecting-terminal cutting and crimping device", when applicable), and more particularly to an improvement of a connecting-terminal cutting and crimping device which cuts off a plurality of connecting terminals which are provided like a chain of rings, and crimps predetermined portions of each connecting terminal over a given covered conductor to connect the former to the latter.

2. Description of the Related Art

A plurality of connecting terminals of this type are shown in FIG. 1. The connecting terminals 10 are formed by punching a flat-plate-shaped electrically conductive material. One end portion of each connecting terminal 10 is formed into a connecting portion 12, and the other end portion, namely, its base end portion, includes a pair of core squeezing protrusions 14 which are raised to confront each other, a pair of cover squeezing protrusions 15 which are also raised to confront each other, and an elongated coupling protrusion 17. The connecting terminals 10 are coupled through the coupling protrusions 17 to one edge of a carrier plate 16 in such a manner that they are arranged in parallel at equal intervals. The carrier plate 16 has a plurality of positioning and feeding holes 18 at predetermined positions corresponding to the positions of the connecting terminals 10.

Each of the connecting terminals 10 is fixedly connected to a covered conductor 21 whose cover is removed at one end to expose a core 22. For this purpose, a connecting-terminal cutting and crimping device (a so-called "anvil crimper") which performs the cutting of the coupling protrusion 17 and the crimping of the core squeezing protrusions 14 and the cover squeezing protrusions 15 at the same time, is used as disclosed, for instance by Japanese Patent Unexamined Publication No. Hei. 3-152891. That is, with the device, the coupling protrusion 17 is cut to disconnect the connecting terminal 10 from the carrier plate 16, while the pair of core squeezing protrusions 14 and the pair of cover squeezing protrusions 15 are crimped over the covered conductor 21 whose cover has been removed at one end to expose the core 22.

The conventional connecting-terminal cutting and pressing device, as shown in FIGS. 8 and 9, includes: a lower stationary die assembly including an anvil 31; and an upper movable die assembly including a position confirming punch 41, a cutting punch 51, a cover-squeezing-protrusion crimping punch 61, and a core-squeezing-protrusion crimping punch 71. The anvil 31 is made up of a cutting die 32, and a shaping die 37. The cutting die 32 has a vertical slide groove 33, and a cutting member 34 with a slit 35 which is vertically movable and provided in the groove 33. The carrier plate 16 together with a predetermined part of the coupling protrusion 17 is fixedly inserted into the slit 35. The cutting member 34 is kept urged upwardly by a compression spring 36.

As shown in FIGS. 10(*a*) and 10(*b*), the upper surface of the shaping die 37 includes a cover-squeezing-protrusion supporting surface 38 which is set back from the upper surface and extended straightly to support the cover squeezing protrusions 15 and the predetermined part of the coupling protrusion 17, and a core-squeezing-protrusion supporting surface 39 which merges through a sloped supporting surface with the cover-squeezing-protrusion supporting surface 38. The core-squeezing-protrusion supporting surface 39 is used to support the core squeezing protrusions 14.

The position confirming punch 41 has a recess 42 formed in the bottom to detect whether or not the connecting terminal 10 to be placed on the anvil 31 is positioned as required.

The cutting punch 51 has a depressing surface 52 as its bottom. The depressing surface 52 depresses the cutting member 34, so that its cutting end 35*a* cuts the connecting terminal 10 off the carrier plate 16. The cover-squeezing-protrusion crimping punch 61 has a crimping surface 62 which is used to crimp the cover crimping protrusions 15 over the cover 23 of the covered conductor so that the former 15 are fixedly connected to the latter 23. The core-squeezing-protrusion crimping punch 71 also has a crimping surface 72 which is used to crimp the core squeezing protrusions 14 over the core 22 exposed so that the former 14 are fixedly connected to the latter 22.

With the above-described connecting-terminal cutting and crimping device, the connecting terminal 10 is cut off the carrier plate 16 and connected to the covered conductor 21 as follows:

First, as shown in FIG. 8, the lower stationary die assembly, namely, the anvil 31 is fixedly set, and the upper movable die assembly, namely, the position confirming punch 41, the cutting punch 51, the cover-squeezing-protrusion crimping punch 61, and the core-squeezing-protrusion crimping punch 71 are set at their operation start positions, respectively. Under this condition, the connecting terminal 10 is set on the anvil 31. More specifically, the carrier plate 16 together with the predetermined part of the coupling protrusion 17 of the connecting terminal 10 is inserted into the slit 35 of the cutting member 34, and the cover squeezing protrusions 15 and the core squeezing protrusions 14 are set on the cover-squeezing-protrusion supporting surface 38 and the core-squeezing-protrusion supporting surface 39, respectively, and accordingly the connecting portion 12 of the terminal 10 is confronted with the recess 42 of the position confirming punch 41. Thus, it is determined whether or not the connecting terminal 10 is positioned correctly.

Next, as shown in FIG. 9, the upper movable die assembly is pressed against the lower stationary assembly. In this operation, it is detected with the aid of the recess 42 of the position confirming punch 41 whether or not the connecting terminal 10 is positioned correctly. The following operations are carried out at the same time or substantially at the same time: the cutting member 34 of the cutting die 32 is depressed by the cutting punch 51 through its depressing surface 52; the coupling protrusion 17 is cut with the cutting edge 35*a*; the cover squeezing protrusions 15 are crimped over the cover of the end portion of the covered conductor 21 by the cover-squeezing-protrusion crimping punch 61 through its crimping surface 62; and the core squeezing protrusions 14 are crimped over the exposed core 22 of the end portion of the covered conductor 21 by the core-squeezing-protrusion crimping punch 71. Thus, the connecting terminal 10 is fixedly connected to the covered conductor 21 by being crimped on the device as shown in FIG. 11.

Thereafter, the upper movable die assembly, namely, the punches 41, 51, 61 and 71 are moved upwardly to the original positions, and the carrier plate 16 held in the slit 35 of the cutting member 34 is shifted with the aid of the positioning and feeding holes 18 until the following connecting terminal comes to the working position. Under this condition, the above-described operations are automatically carried out all over again, to connect the connecting terminal to the covered conductor. And the remaining connecting terminals are also connected to the respective covered conductors in the same manner.

However, the above-described conventional connecting-terminal cutting and crimping device suffers from the following difficulties:

As shown in FIGS. 10(*a*) and 10(*b*), the cover-squeezing-protrusion supporting surface 38 of the shaping die 37, which forms a part of the upper surface of the die 37 and supports the cover squeezing protrusions 15 and the predetermined part of the coupling protrusion 17 of the connecting terminal 10, is straight in the horizontal direction. Hence, in the case where the cover squeezing protrusions 15 of the connecting terminal 10 are straight with respect to the coupling protrusion 17, burrs are liable to be formed at the cut end of the coupling protrusion 17. The burrs may damage a rubber plug or the like when the terminal is inserted into the connector housing.

In order to eliminate this difficulty, the following method is employed. That is, as shown in FIG. 8, the cover squeezing protrusions 15 are downwardly curved with respect to the cover-squeezing-protrusion supporting surface 38. That is, the cover squeezing protrusions 15 are curved to prevent the formation of burrs at the cut end of the coupling protrusion 17. However, the method gives rise to another problem. That is, in cutting off the connecting terminal, the cover squeezing protrusions 15 thus curved act to raise the coupling protrusion 17, so that the latter 17 becomes unstable in posture. Hence, when the coupling protrusion 17 is cut, its cut end portion 17*a* is sharpened upwardly as shown in FIG. 11 (hereinafter referred to as "a sharp end portion 17*a*", when applicable). When the cover squeezing protrusions 15 are crimped over the covered conductor 21, the sharp end portion 17*a* may bite the surface of the cover 23 of the covered conductor 21, and at worst contacts the core 22 of the covered conductor 21, thus causing troubles such as short-circuiting.

SUMMARY OF THE INVENTION

Accordingly, an object of the invention is to eliminate the above-described difficulties accompanying the conventional connecting-terminal cutting and crimping device.

More specifically, an object of the invention is to provide a connecting-terminal cutting and crimping device for connecting a connecting terminal to a covered conductor with which a predetermined part of the coupling protrusion of the connecting terminal, when cut, is prevented from forming a sharp end, so that the connecting terminal is fixedly connected to the covered conductor with the predetermined part thus cut being prevented from cutting into the cover of the covered conductor beyond the thickness of the cover.

In order to attain the foregoing object, the invention provides a connecting-terminal cutting and crimping device including: a crimping unit including a stationary shaping die, a cover-squeezing-protrusion crimping punch and a core-squeezing-protrusion crimping punch which are movable with respect to the shaping die. The crimping unit receives a plurality of connecting terminals, each of which have a pair of cover squeezing protrusions, a pair of core squeezing protrusions, and an elongated coupling protrusion, and which are connected through the coupling protrusions to a carrier plate in such a manner that the connecting terminals are juxtaposed at equal intervals. The crimping unit crimps the cover squeezing protrusions over a cover of a covered conductor, and crimps the core squeezing protrusions over the core of the covered conductor; and a cutting unit comprising a stationary cutting die and a cutting punch which is movable with respect to the cutting die receives the carrier plate and cuts the coupling protrusions before the cover squeezing protrusions and core squeezing protrusions are crimped. A working surface of the shaping die in the crimping unit includes a cover-squeezing-protrusion supporting surface to support the cover squeezing protrusions of each connecting terminal together with a predetermined part of the coupling protrusion, the cover-squeezing-protrusion supporting surface including a curved surface which is arcuately raised to support the predetermined part of the coupling protrusion.

Further, the invention provides a connecting-terminal cutting and crimping method including the steps of: providing a plurality of connecting terminals, which have each a pair of cover squeezing protrusions, a pair of core squeezing protrusions, and an elongated coupling protrusion, and which are connected through the coupling protrusions to a carrier plate in such a manner that the connecting terminals are juxtaposed at equal intervals; providing a cutting unit including a stationary cutting die, and a cutting punch which is movable with respect to the cutting die; providing a crimping unit including a stationary shaping die, a cover-squeezing-protrusion crimping punch and a core-squeezing-protrusion crimping punch, which are movable with respect to the shaping die, a working surface of the shaping die having a curved surface which is arcuately raised to support a predetermined part of the coupling protrusion; setting the carrier plate in the cutting unit to cut the coupling protrusion; crimping the cover squeezing protrusions of the connecting terminal over a cover of a covered conductor; and crimping the core squeezing protrusions of the connecting terminal over a core of the covered conductor by the crimping unit respectively.

BRIEF DESCRIPTION OF THE DRAWINGS

In the accompanying drawings:

FIG. 4(*b*) is a front view outlining the same;

FIG. 10(*b*) is a front view outlining the same; and

DETAILED DESCRIPTION OF THE PREFERRED EMBODIMENT

Figure 1:
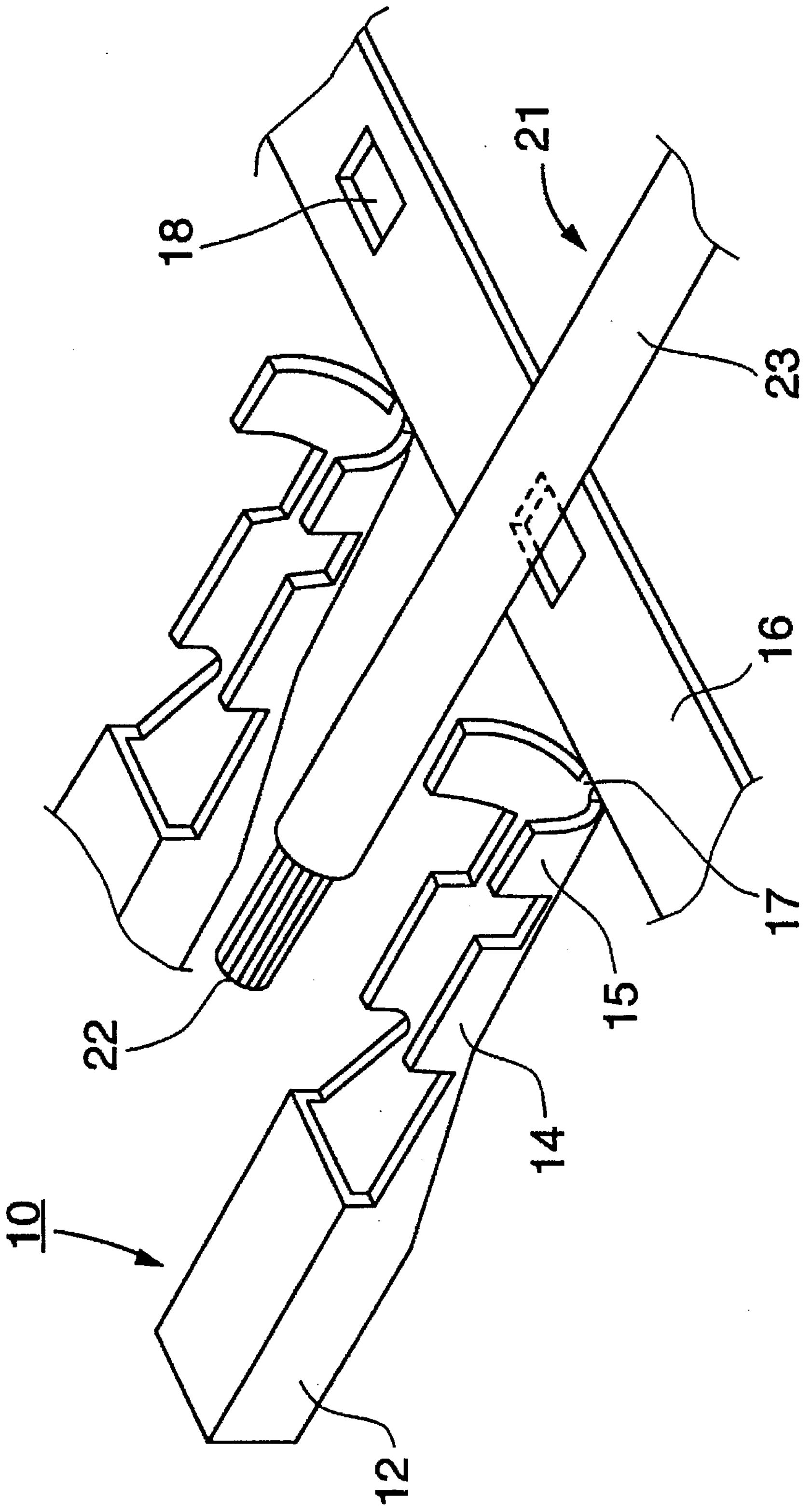
FIG. 1 is a perspective view showing a plurality of connecting terminals arranged at equal intervals.

A connecting-terminal cutting and crimping device, which constitutes an embodiment of the invention, will be described with reference to FIGS. 1 through 7, in which parts corresponding functionally to those which have been described with reference to the conventional device are designated by the same reference numerals or characters.

Figure 4:
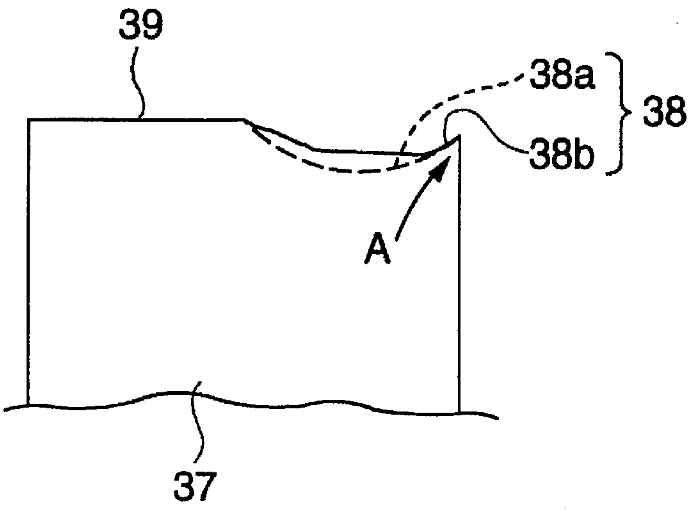
FIG. 4(*a*) is a side view outlining the working surface of a shaping die in the device of the embodiment.
Figure 4:
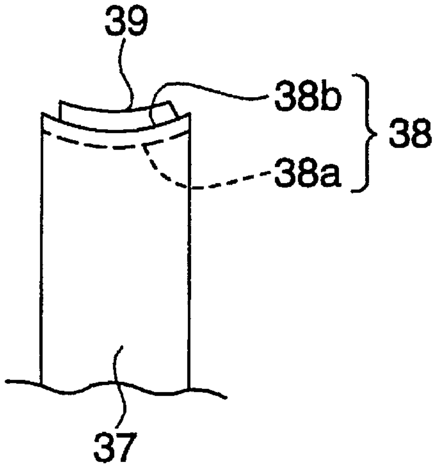
Figure 5:
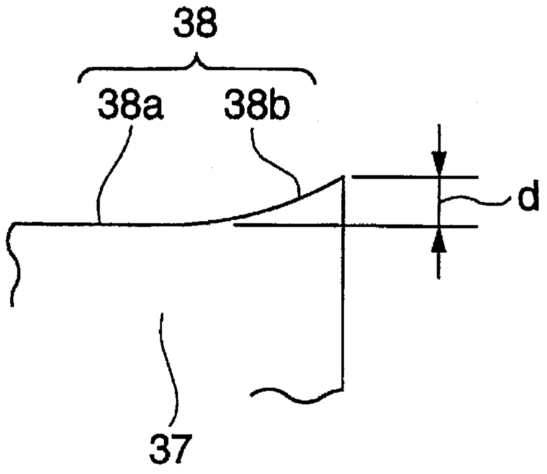
FIG. 5 is an enlarged view of the part of FIG. 4(*a*) indicated by the arrow A.

In the device of the embodiment, as shown in FIGS. 4(*a*), 4(*b*) and 5, the cover-squeezing-protrusion supporting surface 38 forming a part of the working surface of the shaping die 37 includes: a surface 38*a* which is sunk as much as a depth d smaller than the thickness t (FIG. 7) of the cover 23 of the covered conductor 21 (t>d) to support the cover squeezing protrusions 15 (hereinafter referred to as "a sunk surface 38*a*", when applicable); and a surface 38*b* which is arcuately raised to support the coupling protrusion 17 (hereinafter referred to as "a curved surface 38*b*", when applicable).

Figure 2:
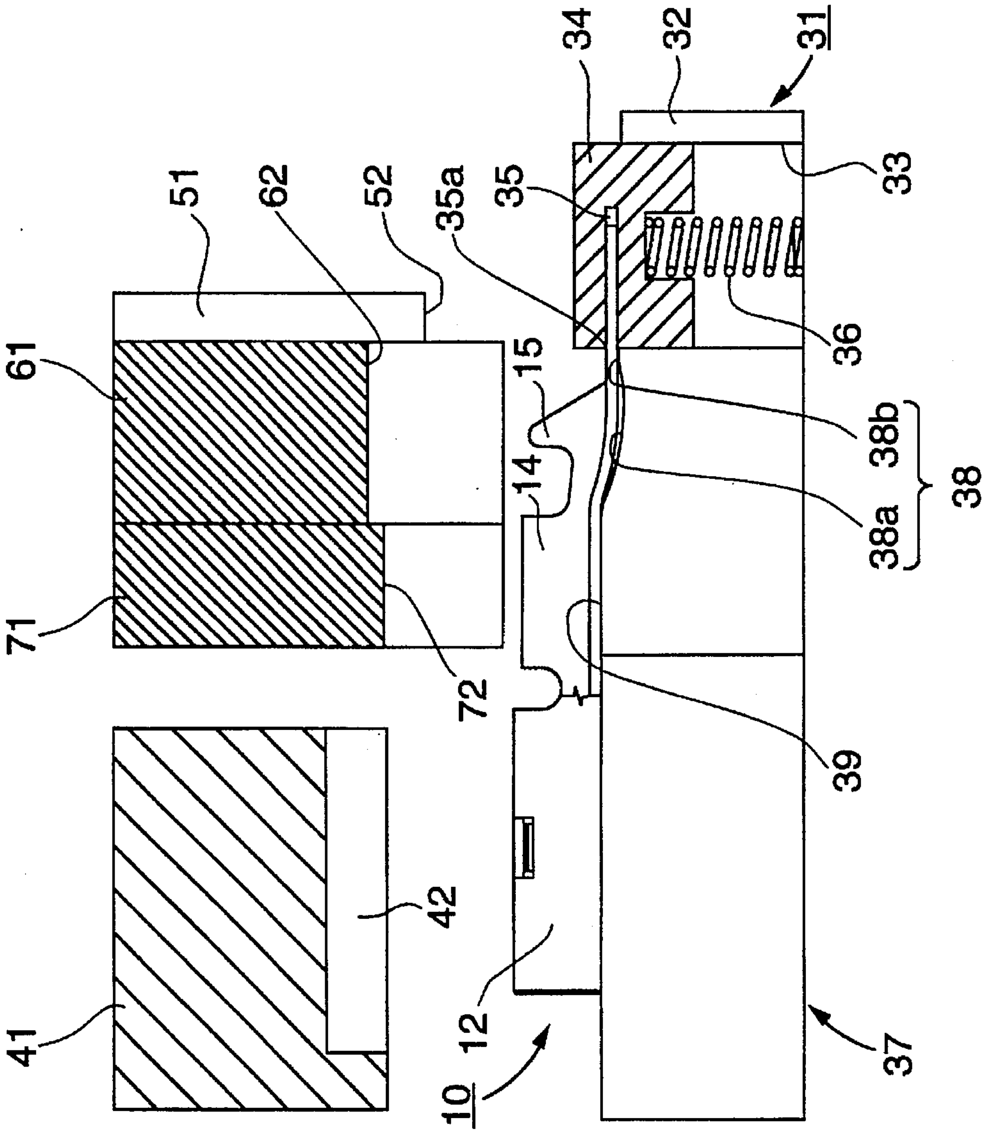
FIG. 2 is a sectional view of a connecting-terminal cutting and crimping device according to an embodiment of the invention before it is operated.
Figure 6:
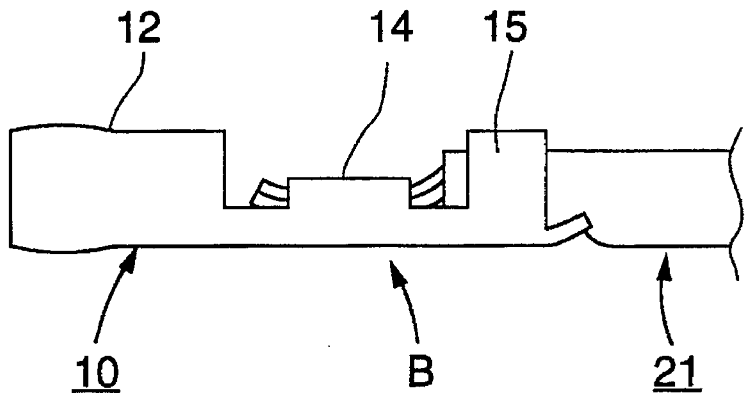
FIG. 6 is a side view showing a connecting terminal and a covered conductor which are joined together by use of the device of the embodiment.

When the upper movable die assembly, namely, the punches 41, 51, 61 and 71 are pressed against the lower stationary die assembly including the shaping die 37 and the cutting die 32 as shown in FIG. 2, it is detected with the aid of the recess 42 of the position confirming punch 41 whether or not the connecting terminal 10 is positioned correctly. The following operations are carried out at the same time or substantially at the same time: the cutting member 34 of the cutting die 32 is depressed by the cutting punch 51 to cut the coupling protrusion 17; the cover squeezing protrusions 15 are crimped over the cover of the covered conductor 21 by the cover-squeezing-protrusion crimping punch 61 through its crimping surface 62; and the core squeezing protrusions 14 are crimped over the exposed core 22 of the covered conductor 21 by the core-squeezing-protrusion crimping punch 71 through its crimping surface 72. Thus, the connecting terminal 10 is fixedly connected to the covered conductor 21 by being crimped on the device as shown in FIG. 6.

It should be noted that, in the device of the embodiment, the cover-squeezing-protrusion supporting surface 38 of the shaping die 37, which supports the cover squeezing protrusions 15 and the predetermined part of the coupling protrusion 17 of the connecting terminal 10, includes: the sunk surface 38*a* which is set back as much as a depth smaller than the thickness of the cover 23 of the covered conductor 21 to support the cover squeezing protrusions 15; and the curved surface 38*b* which is arcuately raised to support the predetermined part of the coupling protrusion 17.

As shown in FIG. 2, when the connecting terminal 10 is set on the lower stationary die assembly, the cover squeezing protrusions 15 are spaced from the sunk surface 38*a* while the middle of the coupling protrusion 17 is supported by the curved surface 38*b*; in other words, the connecting terminal 10 is horizontal.

Figure 3:
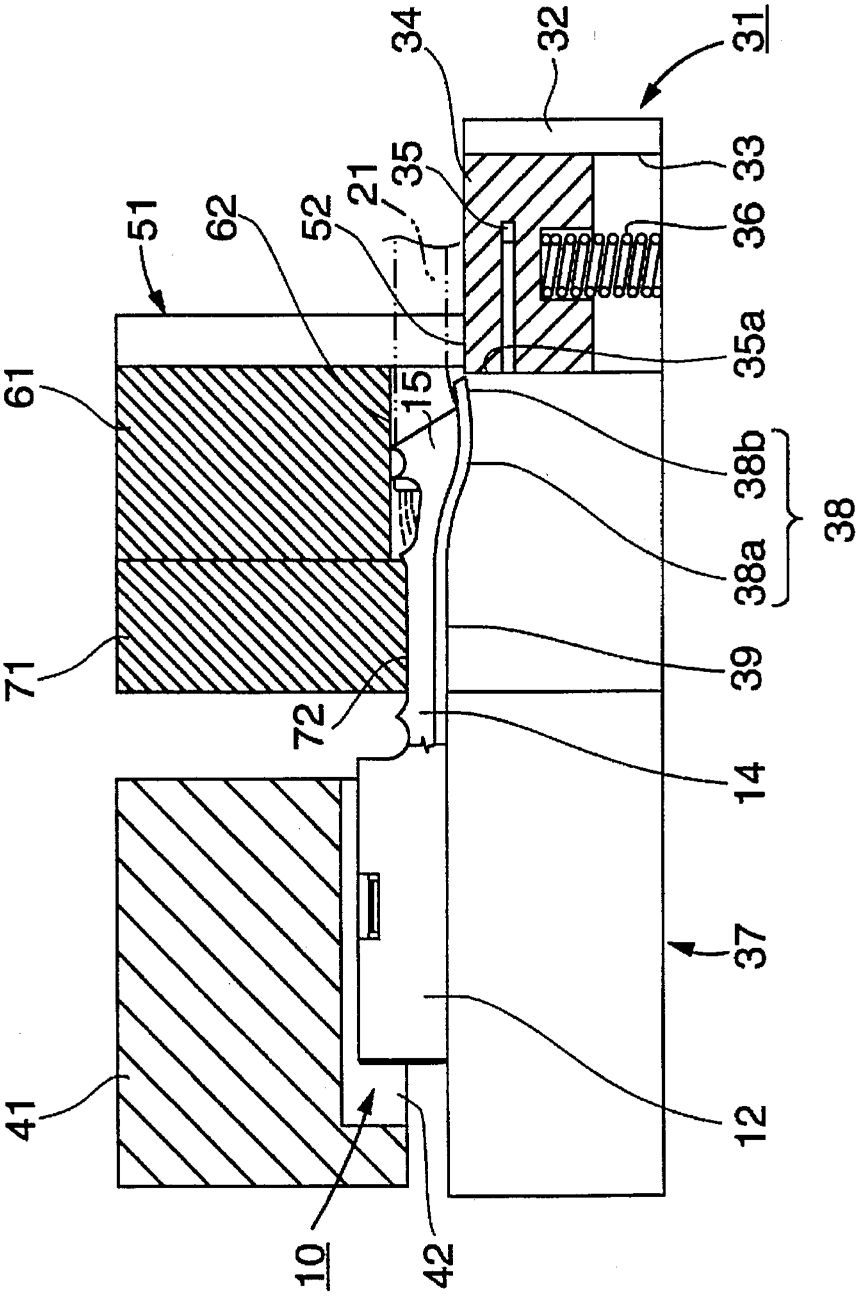
FIG. 3 is a sectional view showing the device of the embodiment which has been operated.
Figure 7:
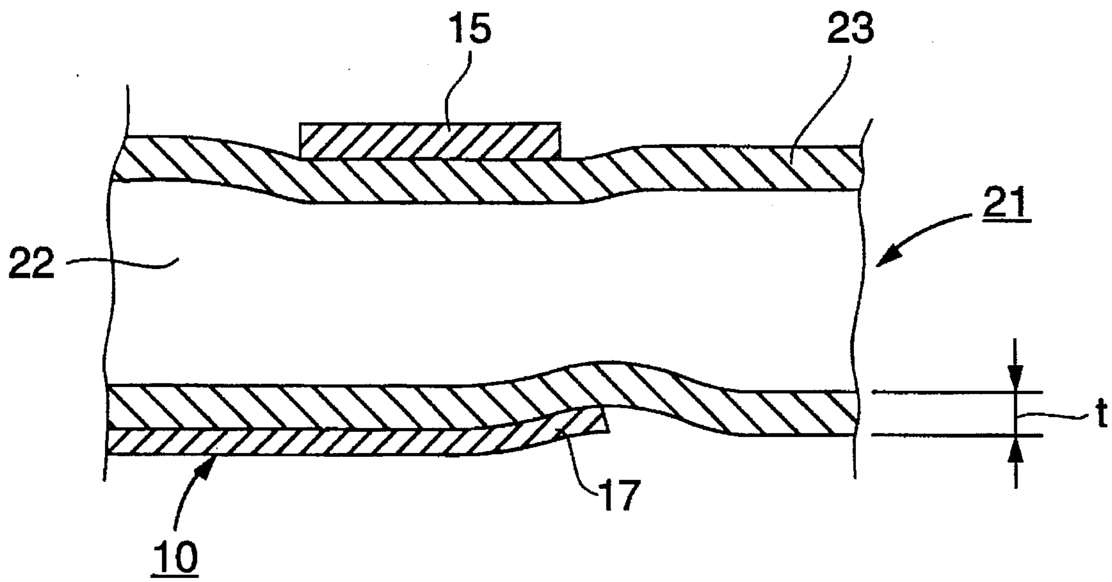
FIG. 7 is an enlarged sectional view showing the part of FIG. 6 which is indicated by the arrow B.
Figure 8:
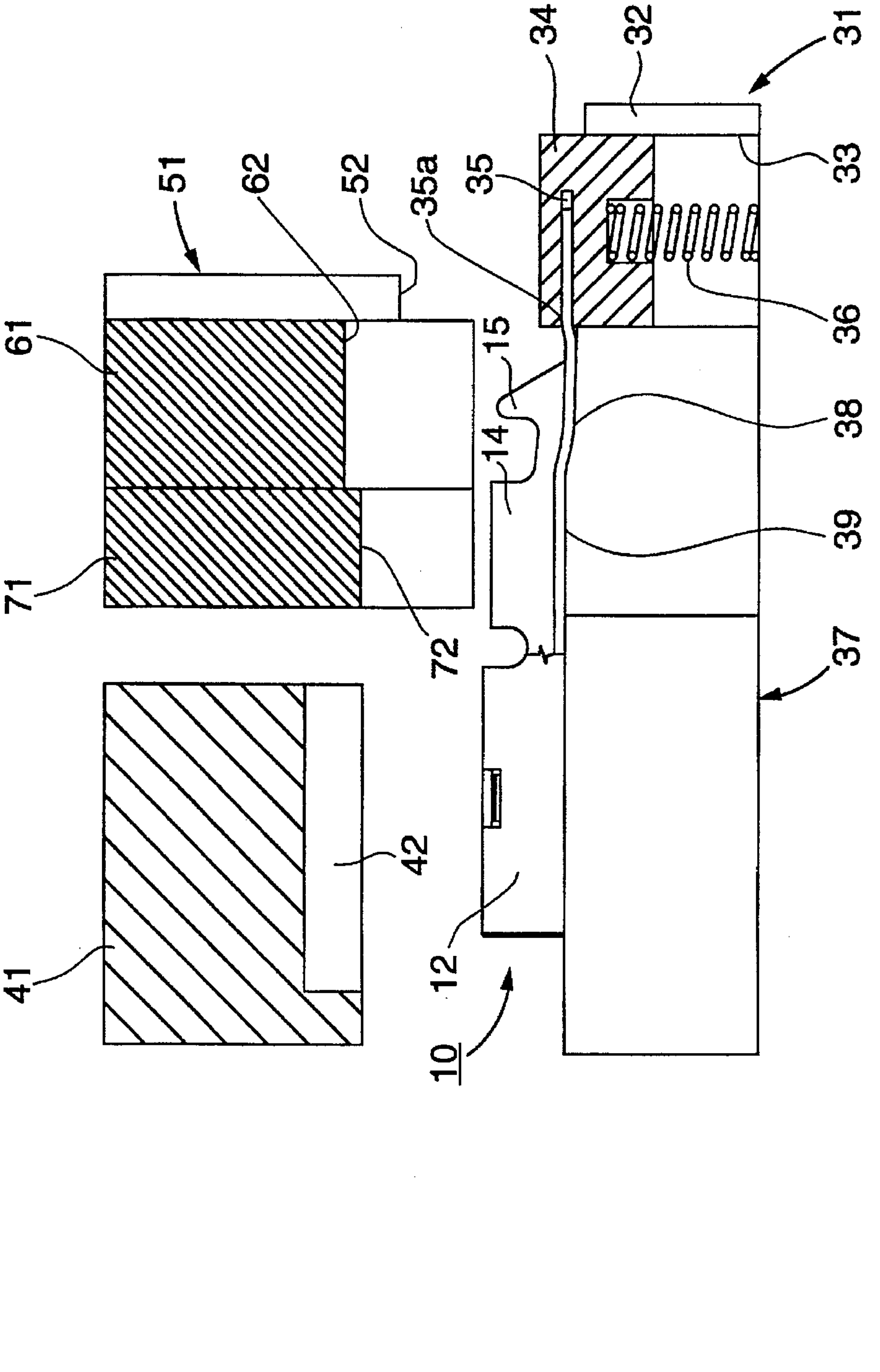
FIG. 8 PRIOR ART
FIG. 8 is a sectional view of a conventional connecting-terminal cutting and crimping device before it is operated.
Figure 9:
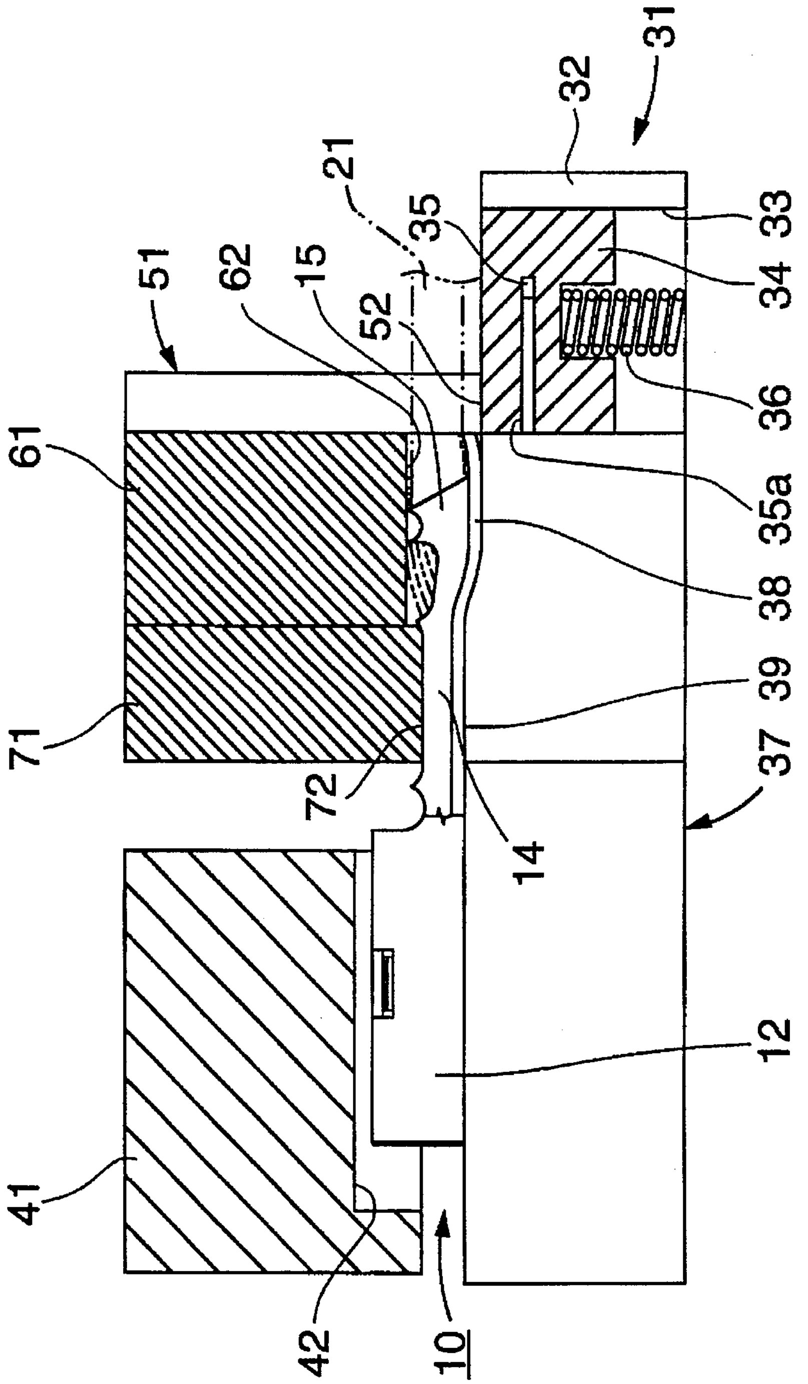
FIG. 9 PRIOR ART
FIG. 9 is a sectional view showing the conventional device which has been operated.
Figure 10:
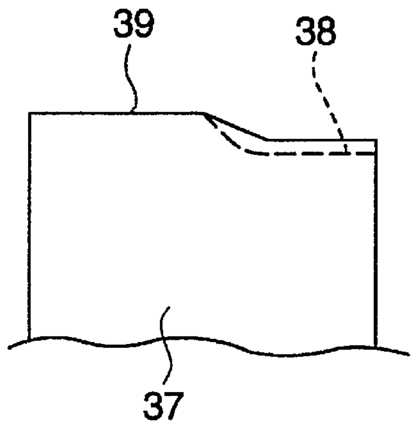
FIG. 10 (a) PRIOR ART
FIG. 10(*a*) is a side view outlining the working surface of a shaping die in the conventional device.
Figure 10:
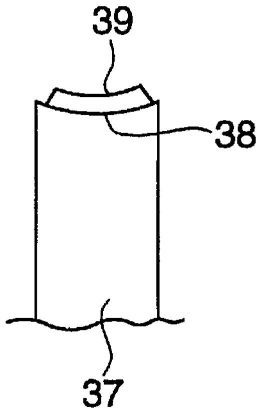
FIG. 10 (b) PRIOR ART
Figure 11:
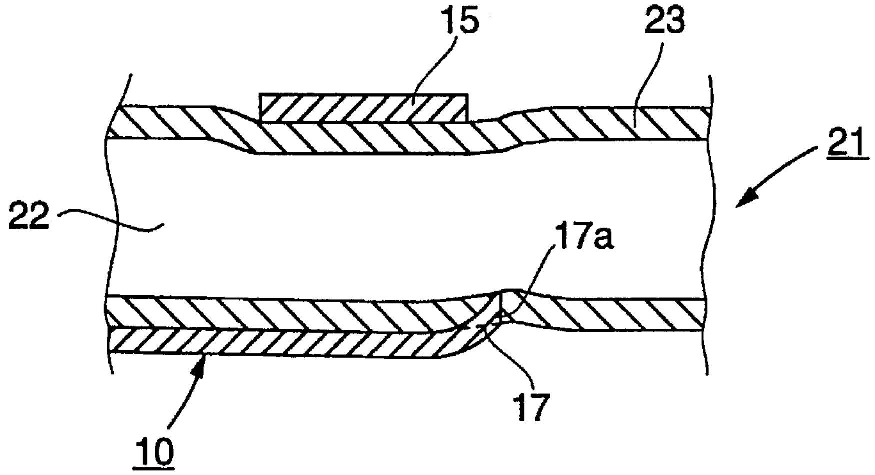
FIG. 11 PRIOR ART
FIG. 11 is an enlarged sectional view showing a connecting terminal and a covered conductor which are joined together by use of the conventional device.

Since the connecting terminal 10 is held horizontal, as shown in FIG. 3 the coupling protrusion 17 is cut in the direction of its thickness or vertically, thus forming no sharp end. The cover squeezing protrusions 15 are suitably shaped by the sunk surface 3*a*, while the remaining part of the coupling protrusion 17 is so curved by the curved surface 38*b* that it cuts into the cover 23 but not beyond the thickness t of the latter 23. Thus, the connecting terminal 10 is fixedly connected to the covered conductor 21 as shown in FIGS. 6 and 7.

As was described above, in the connecting-terminal cutting and crimping device of the invention, the cover-squeezing-protrusion supporting surface of the shaping die includes the curved surface which is arcuately raised to support the predetermined part of the coupling protrusion of the connecting terminal, and the sunk surface whose depth is smaller than the thickness of the cover of the covered conductor.

Hence, in the terminal cutting and crimping operation, the coupling protrusion is cut in the direction of its thickness or vertically, thus forming no sharp end. The cover squeezing protrusions are suitably shaped by the sunk surface, while the remaining part of the coupling protrusion which has been cut is so curved by the curved surface that it cuts into the cover but not beyond the thickness of the cover.

Accordingly, the device of the invention is free from the disadvantages arising when the cut end of the coupling protrusion of the connecting terminal damages the cover of the covered conductor or contacts the core of the latter breaking the cover, and damages the connector housing. That is, the connecting terminals connected to the covered conductors with the device of the invention are high in reliability.

The device of the invention can be provided by changing the configuration of the working surface of the shaping die; that is, the invention can be readily practiced. In addition, the technical concept of the invention is applicable to conventional connecting terminals, which contributes to a reduction in manufacturing cost of the latter.

While the invention has been described with reference to the preferred embodiment of this invention, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. A connecting-terminal cutting and crimping device comprising:

a crimping unit including a stationary shaping die, and a cover-squeezing-protrusion crimping punch and a core-squeezing-protrusion crimping punch which are movable with respect to said shaping die, said crimping unit sequentially receiving a plurality of connecting terminals, each of said terminals having a pair of cover squeezing protrusions, a pair of core squeezing protrusions, and an elongated coupling protrusion extending from a longitudinal end of said terminal, and being connected through said coupling protrusion to a carrier plate in such a manner that said connecting terminals are juxtaposed at equal intervals; wherein said crimping unit crimps said cover squeezing protrusions over a cover of a covered conductor, and said crimping unit crimps said core squeezing protrusions over a core of the covered conductor; and a cutting unit including a stationary cutting die and a cutting punch which is movable with respect to said cutting die, said cutting unit receiving said carrier plate and cutting a predetermined part of said coupling protrusion before said cover squeezing protrusions and said core squeezing protrusions are crimped;

wherein a working surface of said shaping die in said crimping unit includes a cover-squeezing-protrusion supporting surface to support said terminal below said cover squeezing protrusions of each said connecting terminal together with said predetermined part of said coupling protrusion, said cover-squeezing-protrusion supporting surface including a curved surface which is curved about an axis perpendicular to a longitudinal axis of said terminal, an end of said curved surface being raised to support said predetermined part of said coupling protrusion.

2. The device according to claim 1, wherein the distance between a lowermost part of said curved surface and an uppermost part of said raised end of said curved surface is smaller than a thickness of said cover of said covered conductor.

3. The device according to claim 1, wherein when said cover-squeezing-protrusion crimping punch in said crimping unit crimps said cover squeezing protrusions of said connecting terminal over said cover of said covered conductor, a cut end portion of said coupling protrusion is pushed against said cover-squeezing-protrusion supporting surface by said cover-squeezing-protrusion crimping punch and curved so as to bite the cover of said covered conductor.

4. The device according to claim 1, wherein a cutting member having a slit in which said carrier plate together with said predetermined part of said coupling protrusion of each said connecting terminal is held, is vertically movably provided in said cutting die of said cutting unit.

5. The device according to claim 4, wherein said cutting member is kept urged upwardly by a spring member.

6. A connecting-terminal cutting and crimping method comprising the steps of:

providing a plurality of connecting terminals, each of said terminals having a pair of cover squeezing protrusions, a pair of core squeezing protrusions, and an elongated coupling protrusion extending from a longitudinal end of said terminal, and each of said terminals being connected through said coupling protrusion to a carrier plate in such a manner that said connecting terminals are juxtaposed at equal intervals;

providing a cutting unit including a stationary cutting die and a cutting punch which is movable with respect to said cutting die for cutting a predetermine a part of said coupling protrusion;

providing a crimping unit including a stationary shaping die and a cover-squeezing-protrusion crimping punch and a core-squeezing-protrusion crimping punch which are movable with respect to said shaping die, a working surface of said shaping die having a curved surface Which is curved about an axis perpendicular to a longitudinal axis of said terminals, an end of said curved surface being raised to support said predetermined part of said coupling protrusion;

setting said carrier plate in said cutting unit to cut said predetermined part of said coupling protrusion; and crimping said cover squeezing protrusions of said connecting terminal over a cover of a covered conductor, and crimping said core squeezing protrusions of said connecting terminal over a core of said covered conductor with said crimping unit.

* * * * *